March 20, 1962 C. WEGNER ET AL 3,026,333
PROCESS FOR THE CONTINUOUS PRODUCTION OF PROPYLENE OXIDE
Filed Sept. 28, 1959
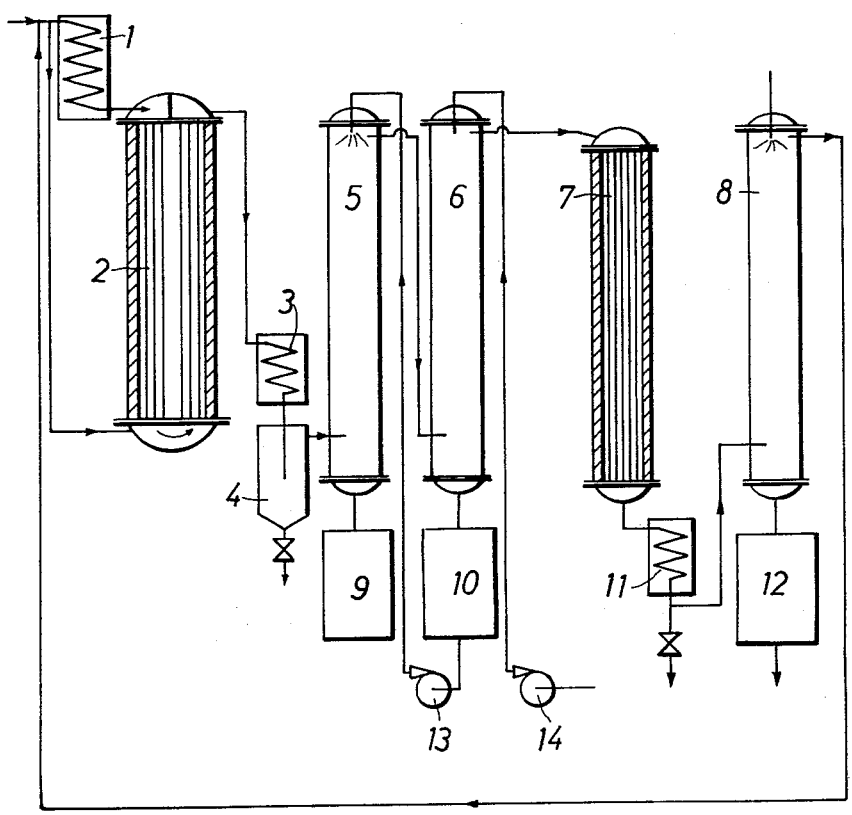
INVENTORS:
CHRISTIAN WEGNER, KURT HESS,
and HANS HABERLAND
By Burgess, Dinklage & Sprung
ATTORNEYS 3,026,333
PROCESS FOR THE CONTINUOUS PRODUCTION OF PROPYLENE OXIDE
Christian Wegner, Leverkusen-Bayerwerk, Kurt Hess, Leverkusen, and Hans Haberland, Leverkusen-Bayerwerk, Germany, assignors to Farbenfabriken Bayer Aktiengesellschaft, Leverkusen, Germany, a corporation of Germany
Filed Sept. 28, 1959, Ser. No. 842,883
Claims priority, application Germany Sept. 29, 1958
4 Claims. (Cl. 260—348.5)

This invention relates to the continuous production of propylene oxide.

It is known that propane and propylene can be oxidized in the gas phase, propylene oxide and other oxidation products being obtained. The oxidation is carried out by using propane and propylene in excess over the oxygen and recycling the unreacted propane and/or propylene. The hitherto known processes have however the disadvantage that they cannot be carried out in a fully continuous manner, but that when carried out in this form, some of the propylene or propane which is unreacted in the oxidation and therefore recycled must be discharged and replaced by fresh propylene (cf. U.S. patent specification No. 2,530,509).

It has now been found that the continuous oxidation of propylene or of mixtures of propylene and propane at elevated temperature and pressure with oxygen, isolation of the reaction products more especially the propylene oxide and acetaldehyde, recycling the unreacted propylene and/or propane ("cycle gas"), which is used again for the formation of propylene oxide after replenishing the propylene used, can be carried out in an economic manner if the carbon monoxide which forms as by-product during the propylene oxide formation is removed from the remaining residual gas ("cycle gas"), which is used again for the propylene oxide formation. The carbon monoxide is removed by increasing the content of oxygen in the residual gas so that the carbon monoxide formed in the process is oxidized to carbon dioxide. This is done by passing the gas mixture over an oxidation catalyst at temperatures which are below the temperature necessary for the oxidation of propylene, the carbon dioxide is removed from the gas mixture and the residual gas (cycle gas), after replacement of the propylene used up, is again supplied to the propylene oxidation stage.

The process according to the invention is explained by the enclosed flow diagram:

The initial gas used for the oxidation of propylene consists of the circulation gas (the returned fractions of the gas mixture unreacted in the oxidation step) in which the consumed propylene fraction is replaced by fresh propylene, and oxygen. The gas mixture introduced generally contains approximately 25 to 90% by volume, advantageously 30 to 60% by volume, of propylene and 2 to 6% by volume of oxygen. The residual quantity of the gas mixture generally consists of relatively small quantities of carbon monoxide optionally propane and inert gases. This gas mixture is conducted at elevated pressure, for example at approximately 6 to 8 atm., through a preheater 1 and is heated therein to temperatures in the range of approximately 250 to 300° C. After leaving the preheater, the gas mixture is introduced into the reactor 2. This reactor is a heat exchanger in which the reaction gases are for example conveyed through nests of tubes. In the reactor, the oxidation of the propylene takes place at elevated temperature, for example in the temperature range between 300 and 500° C., advantageously 330 to 400° C. The reaction temperature in the reactor can be mantained by methods known per se, for example by discharging the heat of reaction by evaporation of water under pressure or by other heat-dissipating means. Furthermore, it is possible for some of the gas mixture used for oxidation purposes to be supplied directly, without passing through the preheater, to the reactor at a suitable point for regulating the heat of reaction. The residence time of the gas mixture and the gas velocity as well as the diameter of the reaction chambers in the reactor are so adapted to one another that firstly the oxidation which takes place is as complete as possible, but secondly it is possible to maintain the required reaction temperature in order to avoid the formation of undesired oxidation products.

In view of the fact that metal oxides catalyze the complete oxydation of propylene to carbon monoxide and carbon dioxide, those surfaces of the preheater and of the reactor which come into contact with the gas mixture must consist of a metal which cannot easily be oxidized, such as for example stainless steels or brass.

After leaving the reactor 2, the reaction products can be removed from the gas mixture by methods which are known per se, for example by cooling the reaction gas to such an extent in a condenser 3 that a large proportion of the oxidation products such as for example aldehydes, ketones, acids, etc., is separated out in the receiver 4 with some of the water which has formed. The remaining reaction gas can then be conducted through the absorption towers 5 and 6, in which water, which may be recirculated scrubbing water, is conveyed by the pumps 14 and 13 in countercurrent to the reaction gas. The scrubbing water collects in the receivers 10 and 9 and contains the propylene oxide formed during the oxidation and acetaldehyde. In order to avoid saponification of the propylene oxide by traces of acids present in the reaction gases, it is advisable to add small quantities of alkali compounds, such as for example caustic alkali solution, to the scrubbing water, in order to maintain the pH value of the said water at 7 to 7.5. The working up of the scrubbing water containing propylene oxide and acetaldehyde is preferably carried out as soon as possible. The quantity of the reaction gases leaving the top of the absorption tower 6 contains substantially the unreacted propylene, propane if present and perhaps relatively small quantities of carbon dioxide, oxygen and carbon monoxide (for example 2 to 8% by volume of carbon monoxide) as well as other inert gases. If the quantity of oxygen contained in this gas mixture is insufficient for the oxidation of the carbon monoxide contained in the gas mixture which shall be removed, additional quantities of oxygen are added to the mixture so that the oxygen content of the said gas mixture rises to for example 1 to 3% by volume. Preferably the content of oxygen is at least about two times as high as is theoretically necessary for the oxidation of the carbon monoxide to carbon dioxide. This gas mixture is then introduced into the purifying apparatus 7, which contains an oxidation catalyst for the oxidation of carbon monoxide to carbon dioxide, for example a mixture of manganese oxide and copper oxide. The purifying apparatus 7 is kept at a temperature which is below the temperature necessary for the propylene oxidation e.g. in the range between approximately 140 and 190° C., some of the carbon monoxide, which corresponds preferably to about the proportion formed during the oxidation of the propylene, being oxidized to carbon dioxide without oxidation of the propylene taking place. In general the proportion of the carbon monoxide freshly formed during the propylene oxidation is about 1% by volume of the reaction mixture. The temperature most suitable for the oxidation of the carbon monoxide to carbon dioxide can very easily be determined by preliminary tests. In most cases it is of advantage if the temperature is as high as possible, but it is naturally essential that no propylene oxide formation takes place. The carbon dioxide is then removed from the gas mixture by known methods by supplying the gas mixture, for example by way of a condenser 11, to the absorption tower 8 in which an absorption liquid (for example potassium carbonate or diethanolamine) for the carbon dioxide flows in countercurrent to the gas mixture, this liquid collecting again in the receiver 12. The residue discharging from the top of the absorption tower 8 can be directly used again for the propylene oxidation in the form in which it is obtained and after the propylene which has been consumed is replaced by fresh propylene. In a preferred embodiment of the invention the cycle gas has a small, about constant, content of carbon monoxide e.g. between 1 to 8% by volume, since the entire removal of the carbon monoxide is not economical.

The process of the invention renders possible the continuous oxidation of propylene in a cyclic process in an economic manner.

We claim:

1. In the process for the continuous production of propylene oxide by reaction of a hydrocarbon gas selected from the group consisting of propane, propylene and mixtures thereof, with oxygen at elevated temperatures and pressures, removing the oxidation products from said gas and recycling the unreacted hydrocarbon gas for further reaction with oxygen after replacing the hydrocarbon used up in the oxidation reaction, the improvement which comprises adding oxygen to the reaction gas formed in the oxidation of said hydrocarbon gas to propylene oxide in an amount sufficient for oxidation to carbon dioxide of at least a part of the carbon monoxide formed as a by-product during the production of propylene oxide, passing the gas mixture thus produced in contact with an oxidation catalyst at a temperature below the temperature required for an oxidation reaction between the oxygen and the hydrocarbon components of the gas mixture at the pressure employed but at a temperature of at least about 140 degrees C., and removing the carbon dioxide which is thereby formed from said gas mixture.

2. Process as claimed in claim 1 wherein only part of the carbon monoxide formed in said oxidation reaction and contained in said recycled gas mixture is oxidized to carbon dioxide.

3. Process as claimed in claim 1 wherein the carbon monoxide content of said gas mixture is kept between 1 to 8% by volume.

4. Process as claimed in claim 1 wherein the oxidation of the carbon monoxide is carried out within the temperature range of about 140–190° C.

References Cited in the file of this patent
UNITED STATES PATENTS

| | | |
|---|---|---|
| 1,911,746 | Burke et al. | May 30, 1933 |
| 2,530,509 | Cook | Nov. 21, 1950 |

UNITED STATES PATENT OFFICE
CERTIFICATE OF CORRECTION

Patent No. 3,026,333  March 20, 1962

Christian Wegner et al.

It is hereby certified that error appears in the above numbered patent requiring correction and that the said Letters Patent should read as corrected below.

Column 4, line 16, strike out "recycled".

Signed and sealed this 3rd day of July 1962.

(SEAL)
Attest:

ERNEST W. SWIDER
Attesting Officer

DAVID L. LADD
Commissioner of Patents